(12) United States Patent
Inoue et al.

(10) Patent No.: US 11,305,754 B2
(45) Date of Patent: Apr. 19, 2022

(54) CONTROL DEVICE OF VEHICLE

(71) Applicant: HONDA MOTOR CO., LTD., Tokyo (JP)

(72) Inventors: Mamiko Inoue, Saitama (JP); Kentaro Shiraki, Saitama (JP); Tatsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/120,719

(22) Filed: Dec. 14, 2020

(65) Prior Publication Data
US 2021/0188250 A1 Jun. 24, 2021

(30) Foreign Application Priority Data

Dec. 20, 2019 (JP) .............................. JP2019-230833

(51) Int. Cl.
*B60W 20/40* (2016.01)
*B60W 10/06* (2006.01)
*B60W 10/08* (2006.01)

(52) U.S. Cl.
CPC ............ *B60W 20/40* (2013.01); *B60W 10/06* (2013.01); *B60W 10/08* (2013.01); *B60W 2510/0638* (2013.01); *B60W 2520/10* (2013.01)

(58) Field of Classification Search
CPC .. B60W 20/40; B60W 10/06; B60W 2520/10; B60W 2510/0638; B60W 10/08;
(Continued)

(56) References Cited

U.S. PATENT DOCUMENTS

2010/0312422 A1* 12/2010 Imaseki ................ B60W 10/06
                                                              180/65.265
2014/0195084 A1* 7/2014 Ueda ...................... B60K 6/442
                                                              180/65.265
(Continued)

FOREIGN PATENT DOCUMENTS

JP    2010-173389 A    8/2010
JP    2012-245833 A    12/2012
(Continued)

OTHER PUBLICATIONS

Nov. 2, 2021, Japanese Office Action issued for related JP Application No. 2019-230833.

*Primary Examiner* — Yi-Kai Wang
(74) *Attorney, Agent, or Firm* — Paratus Law Group, PLLC (57) ABSTRACT

A control device of a vehicle includes: a travel mode control unit configured to set, based on a traveling state of the vehicle, any travel mode among a plurality of travel modes; and a predicted rotation speed acquisition unit configured to acquire, when a transition condition to a second travel mode is satisfied based on the traveling state of the vehicle that is travelling in a first travel mode, a predicted rotation speed of the internal combustion engine when the travel mode is shifted to the second travel mode at a time when the transition condition is satisfied. The travel mode control unit includes a transition prohibition setting unit configured to prohibit transition to the second travel mode when a difference between a rotation speed of the internal combustion engine when the transition condition is satisfied and the predicted rotation speed is equal to or larger than a threshold value.

4 Claims, 5 Drawing Sheets

(58) Field of Classification Search
CPC . B60W 2050/0096; B60W 2710/0644; B60W 20/17; B60W 20/20; B60W 30/1884; B60K 6/445
USPC .......................................................... 701/22
See application file for complete search history.

(56) References Cited

U.S. PATENT DOCUMENTS

2018/0170357 A1* 6/2018 Lee ........................ B60W 20/40
2020/0122712 A1 4/2020 Miki et al.
2021/0188280 A1* 6/2021 Abe ....................... B60W 30/19

FOREIGN PATENT DOCUMENTS

| JP | 2017-013752 A | 1/2017 |
| WO | WO 2009/069637 A1 | 6/2009 |
| WO | WO 2019/003443 A1 | 1/2019 |

* cited by examiner

| TRAVEL MODE | FIRST CLUTCH | SECOND CLUTCH | ENGINE | MOTOR | GENERATOR |
|---|---|---|---|---|---|
| EV TRAVEL MODE | RELEASE | RELEASE | STOP POWER OUTPUT | DRIVEN BY BATTERY | STOP POWER GENERATION |
| HYBRID TRAVEL MODE | RELEASE | RELEASE | OUTPUT POWER | DRIVEN BY GENERATOR | GENERATE POWER |
| LOW SPEED-SIDE ENGINE TRAVEL MODE | ENGAGE | RELEASE | OUTPUT POWER | STOP POWER OUTPUT | STOP POWER GENERATION |
| HIGH SPEED-SIDE ENGINE TRAVEL MODE | RELEASE | ENGAGE | OUTPUT POWER | STOP POWER OUTPUT | STOP POWER GENERATION |

CONTROL DEVICE OF VEHICLE

CROSS REFERENCE TO RELATED APPLICATION

This application is based upon and claims the benefit of priority from prior Japanese patent application No. 2019-230833, filed on Dec. 20, 2019, the entire contents of which are incorporated herein by reference.

TECHNICAL FIELD

The present invention relates to a control device of a vehicle.

BACKGROUND ART

In recent years, a hybrid electric vehicle has a plurality of travel modes including a hybrid travel mode in which in a state where a clutch is disengaged, a generator generates electric power based on power of an engine, an electric motor outputs power at least based on the electric power supplied by the generator to drive driving wheels; and an engine travel mode in which the driving wheels are driven by at least power output by the engine in a state where the clutch is engaged (for example, see WO 2019/003443).

However, in WO 2019/003443, a sudden change in rotation speed of the engine that is not intended by a driver may occur due to a transition from a series travel mode to the engine travel mode, Such a sudden change in rotation speed of the engine may lead to a reduction in marketability of the vehicle from a viewpoint of vibration and noise, that is, from a so-called viewpoint of Noise and Vibration (NV).

SUMMARY OF INVENTION

An object of the present invention is to provide a control device of a vehicle capable of preventing a sudden change in rotation speed of an engine, that is not intended by a driver and occurs due to a transition from a first travel mode in which a vehicle travels on power output by an electric motor in response to supply of electric power that is generated by a generator based on power of an internal combustion engine and a second travel mode in which the vehicle travels on the power of the internal combustion engine.

According to one aspect of the present invention provides an control device of vehicle configured to travel in a plurality of travel modes including a first travel mode in which in response to supply of electric power generated by a generator, power output by an electric motor is transmitted to a driving wheel to drive the vehicle, the generator generating the electric power by using power of an internal combustion engine, and a second travel mode in which power of the internal combustion engine is transmitted to the driving wheel to drive the vehicle. The control device comprises a travel mode control unit configured to set, based on a traveling state of the vehicle, any travel mode among the plurality of travel modes as a travel mode in which the vehicle travels; and a predicted rotation speed acquisition unit configured to acquire, when a transition condition to the second travel mode is satisfied based on the traveling state of the vehicle that is travelling in the first travel mode, a predicted rotation speed of the internal combustion engine when the travel mode is shifted to the second travel mode at a time when the transition condition is satisfied. The travel mode control unit includes a transition prohibition setting unit configured to prohibit transition to the second travel mode when a difference between a rotation speed of the internal combustion engine when the transition condition is satisfied and the predicted rotation speed acquired by the predicted rotation speed acquisition unit is equal to or larger than a threshold value.

According to the present invention, since the transition to the second travel mode is prohibited at a time when a difference between the rotation speed of the internal combustion engine at a time when the transition condition to the second travel mode is satisfied and the predicted rotation speed of the internal combustion engine at a time when the transition condition is satisfied is equal to or larger than the threshold value, the travel mode is not shifted to the second travel mode, thereby preventing a sudden change in rotation speed of the engine that is not intended by a driver.

DESCRIPTION OF EMBODIMENTS

Hereinafter, a control device of a vehicle according to an embodiment of the present invention will be described in detail with reference to the drawings.

Figure 1:
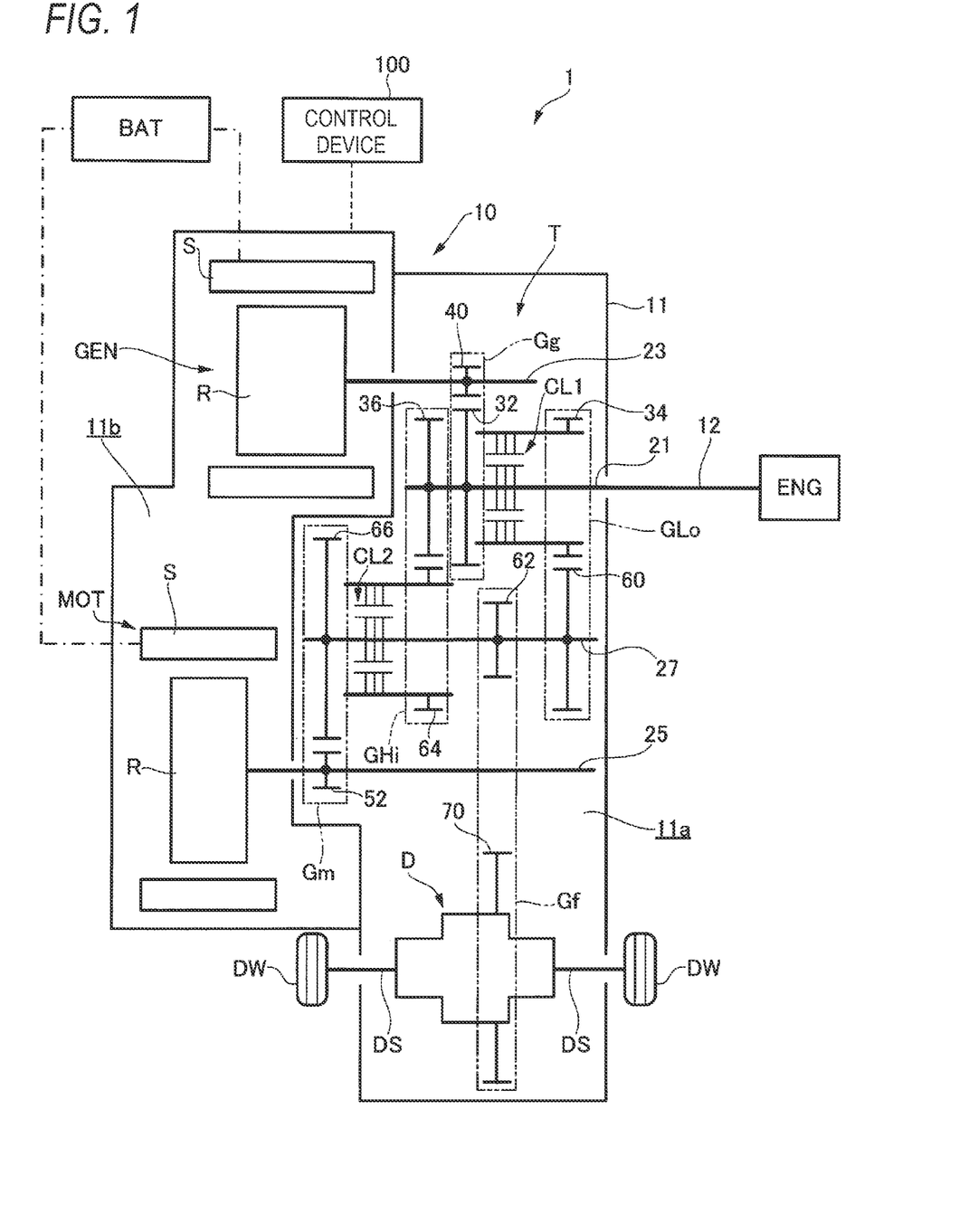
FIG. 1 is a diagram showing a schematic configuration of a vehicle including a control device of a vehicle according to an embodiment of the present invention.

First, a vehicle including the control device according to the present embodiment will be described with reference to FIG. 1. As shown in FIG. 1, a vehicle 1 of the present embodiment includes a driving device 10 that outputs a driving force of the vehicle 1, and a control device 100 that controls the entire vehicle 1 including the driving device 10.

[Driving Device]

As shown in FIG. 1, the driving device 10 includes an engine ENG, a generator GEN, a motor MOT, a transmission T, and a case 11 that accommodates the generator GEN, the motor MOT, and the transmission T. The motor MOT and the generator GEN are connected to a battery BAT provided in the vehicle 1, which enables power supply from the battery BAT and energy regeneration to the battery BAT.

[Transmission]

The case 11 is provided with, along an axial direction in an order from an engine ENG side, a transmission accommodating chamber 11*a* for accommodating the transmission T and a motor accommodating chamber 11*b* for accommodating the motor MOT and the generator GEN.

The transmission accommodating chamber 11*a* accommodates an input shaft 21, a generator shaft 23, a motor shaft 25, a counter shaft 27 that are arranged in parallel to one another, and a differential mechanism D.

The input shaft 21 is arranged coaxially with and adjacently to a crankshaft 12 of the engine ENG. A driving force of the crankshaft 12 is transmitted to the input shaft 21 via a damper (not shown). The input shaft 21 is provided with a generator drive gear 32 constituting a generator gear train Gg.

The input shaft 21 is provided with a low speed-side drive gear 34 provided on an engine side with respect to the generator drive gear 32 and constituting a low speed-side engine gear train GLo via a first clutch CL1, and is provided with a high speed-side drive gear 36 constituting a high speed-side engine gear train GHi on an opposite side of the engine side (hereinafter, referred to as a motor side). The first clutch CL1 is a hydraulic clutch for detachably connecting the input shaft 21 and the low speed-side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23. The generator GEN is disposed on the motor side of the generator shaft 23, The generator GEN includes a rotor R fixed to the generator shaft 23 and a stator S fixed to the case 11 and arranged to face an outer diameter side of the rotor R.

The rotation of the input shaft 21 is transmitted to the generator shaft 23 via the generator gear train Gg, and thus the rotor R of the generator GEN rotates due to the rotation of the generator shaft 23, Therefore, when the engine ENG is driven, power of the engine ENG input from the input shaft 21 can be converted into electric power by the generator GEN.

The motor shaft 25 is provided with a motor drive gear 52 constituting a motor gear train Gm. The motor MOT is disposed on the motor shaft 25 closer to the motor side than the motor drive gear 52. The motor MOT includes a rotor R fixed to the motor shaft 25 and a stator S fixed to the case 11 and arranged to face an outer diameter side of the rotor R.

The counter shaft 27 is provided with, in an order from the engine side, a low speed-side driven gear 60 that meshes with the low speed-side drive gear 34, an output gear 62 that meshes with a ring gear 70 of the differential mechanism D, a high speed-side driven gear 64 that meshes with the high speed-side drive gear 36 of the input shaft 21 via a second. clutch CL2, and a motor driven gear 66 that meshes with the motor drive gear 52 of the motor shaft 25. The second clutch CL2 is a hydraulic clutch for detachably connecting the counter shaft 27 and the high speed-side driven gear 64, and is a so-called multi-plate friction clutch.

The low speed-side drive gear 34 of the input shaft 21 and the low speed-side driven gear 60 of the counter shall 27 constitute the low speed-side engine gear train GLo for transmitting the rotation of the input shaft 21 to the counter shaft 27. Further, the high speed-side drive gear 36 of the input shaft 21 and the high speed-side driven gear 64 of the counter shall 27 constitute the high speed-side engine gear train GHi for transmitting the rotation of the input shaft 21 to the counter shaft 27. Here, the low speed-side engine gear train GLo including the low speed-side drive gear 34 and the low speed-side driven gear 60 has a reduction ratio higher than that of the high speed-side engine gear train GHi including the high speed-side drive gear 36 and the high speed-side driven gear 64.

Therefore, when the first clutch CL1 is engaged and the second clutch CL2 is disengaged at the time of driving the engine ENG, the driving force of the engine ENG is transmitted to the counter shaft 27 via the low speed-side engine gear train GLo at a high reduction ratio. Meanwhile, when the first clutch CL1 is disengaged and the second clutch CL2 is engaged at the time of driving the engine ENG, the driving force of the engine ENG is transmitted to the counter shaft 27 via the high speed-side engine gear train GHi at a low reduction ratio. The first clutch CL1 and the second clutch CL2 are not engaged at the same time.

Further, the motor drive gear 52 of the motor shaft 25 and the motor driven gear 66 of the counter shaft 27 constitute the motor gear train Gm for transmitting the rotation of the motor shaft 25 to the counter shaft 27. When the rotor R of the motor MOT is rotated, the rotation of the motor shaft 25 is transmitted to the counter shaft 27 via the motor gear train Gm. Thus, when the motor MOT is driven, the driving force of the motor MOT is transmitted to the counter shaft 27 via the motor gear train Gm.

The output gear 62 of the counter shaft 27 and the ring gear 70 of the differential mechanism D constitute a final gear train Gf for transmitting the rotation of the counter shaft 27 to the differential mechanism D. Therefore, the driving force of the motor MOT that is input to the counter shaft 27 via the motor gear train Gm, the driving force of the engine ENG that is input to the counter shaft 27 via the low speed-side engine gear train GLo, and the driving force of the engine ENG that is input to the counter shaft 27 via the high speed-side engine gear train GHi are transmitted to the differential mechanism D via the final gear train Gf and transmitted from the differential mechanism D to an axle DS. Therefore, a driving force for the vehicle 1 to travel is output via a pair of driving wheels DW provided at both ends of the axle DS.

The driving device 10 configured as described above has a power transmission path for transmitting the driving force of the motor MOT to the axle DS (that is, the driving wheels Dw), a low speed-side power transmission path for transmitting the driving force of the engine ENG to the axle DS, and a high speed-side power transmission path for transmitting the driving force of the engine ENG to the axle DS. Thus, as will be described later, the vehicle 1 provided with the driving device 10 can take a plurality of travel modes such as an EV travel mode or a hybrid travel mode in which the vehicle travels on power output from the motor MOT, and a low speed-side engine travel mode or a high speed-side engine travel mode in which the vehicle travels on power output from the engine ENG.

The control device 100 acquires vehicle information related to the vehicle 1 based on detection signals received from various sensors provided in the vehicle 1, and controls the driving device 10 based on the acquired vehicle information.

Here, the vehicle information includes information indicating a traveling state of the vehicle 1. For example, the vehicle information includes, as the information indicating the traveling state of the vehicle 1, information such as a speed of the vehicle 1 (hereinafter, also referred to as a vehicle speed), an accelerator pedal (AP) opening degree indicating an operation amount (that is, an accelerator position) with respect to an accelerator pedal provided in the vehicle 1, a required driving force of the vehicle 1 derived based on the vehicle speed, the AP opening and the like, and the rotation speed of the engine ENG (hereinafter referred to as "the engine speed"), The vehicle information further includes battery information related to the battery BAT provided in the vehicle 1. The battery information includes, for example, information indicating a state of charge (SOC) of the battery BAT.

The control device 100 controls the driving device 10 based on the vehicle information to drive the vehicle 1 to travel in any of the plurality of travel modes that the vehicle 1 can take. In the control of the driving device 10, for example, the control device 100 controls the output of power from the engine ENG by controlling the supply of fuel to the engine ENG, controls the output of power from the motor MOT by controlling the supply of electric power to the motor MOT, and controls the generation of power (for example, output voltage) of the generator GEN by controlling a field current or the like flowing through a coil of the generator GEN.

Further, in the control of the driving device 10, the control device 100 controls the first clutch CL1 to be engaged or disengaged by controlling an actuator (not shown) that operates the first clutch CL1. Similarly, the control device 100 controls the second clutch CL2 to be engaged or disengaged by controlling an actuator (not shown) that operates the second clutch CL2.

In this way, by controlling the engine ENG, the generator GEN, the motor MOT, the first clutch CL1 and the second clutch CL2, the control device 100 can drive the vehicle Ito travel in any of the plurality of travel modes that the vehicle 1 can take. The control device 100 is an example of the control device of a vehicle in the present invention, and for example, is implemented by an Electronic Control Unit (ECU) including a processor, a memory, an interface, and the like.

[Travel mode that Vehicle Can Take]

Figure 2:
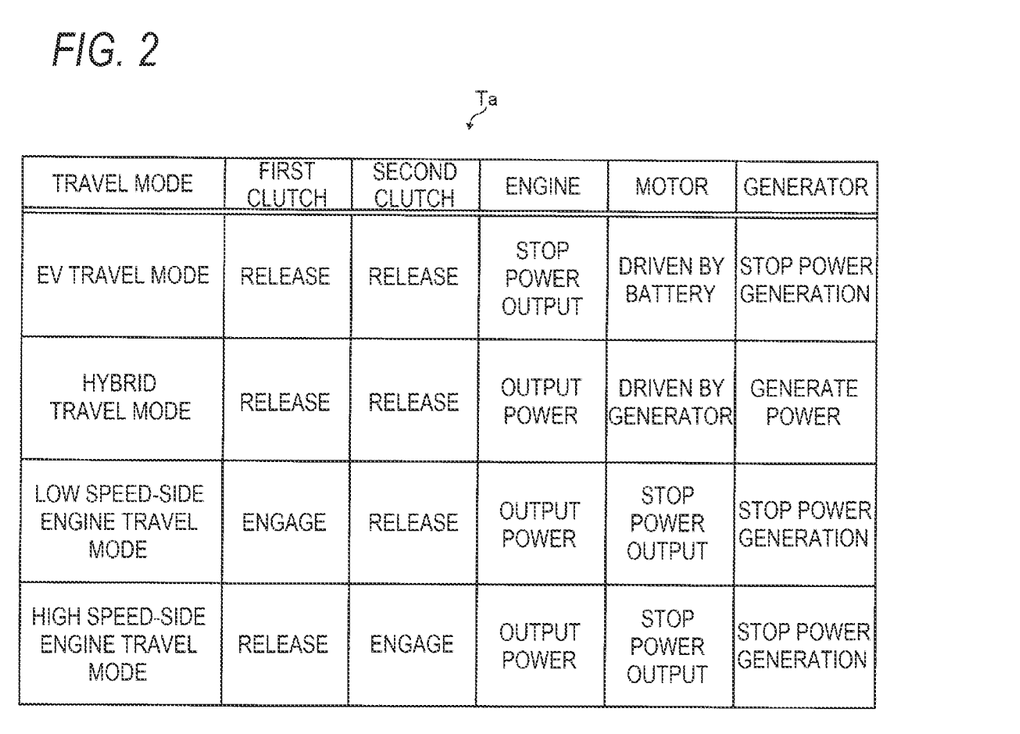
FIG. 2 is a table showing contents of each travel mode.

Next, a travel mode that the vehicle 1 can take will be described with reference to FIG. 2. In FIG. 2, as shown in a travel mode table Ta, the vehicle 1 can take a plurality of travel modes including an EV travel mode, a hybrid travel mode, a low speed-side engine travel mode, and a high speed-side engine travel mode.

[EV Travel Mode]

The EV travel mode is a travel mode in which electric power is supplied to the motor MOT from the battery BAT, and the vehicle 1 travels on power that is output from the motor MOT according to the electric power.

Specifically, in the EV travel mode, the control device 100 controls both the first clutch CL1 and the second clutch CL2 to be disengaged. In the EV travel mode, the control device 100 stops injection of fuel to the engine ENG (so-called fuel cut), and stops output of power from the engine ENG. Then, in the EV travel mode, the control device 100 performs control such that electric power is supplied to the motor MOT from the battery BAT, and power corresponding to the electric power is output to the motor MOT (shown as Motor: "driven by battery"). As a result, in the EV travel mode, the vehicle 1 travels on power that is output from the motor MOT according to the electric power supplied from the battery BAT.

In the EV travel mode, as described above, the output of the power from the engine ENG is stopped, and both the first clutch CL1 and the second clutch CL2 are disengaged. Therefore, in the EV travel mode, no power is input to the generator GEN, and the generator GEN does not generate power (shown as Generator: "stop power generation").

[Hybrid Travel Mode]

The hybrid travel mode is an example of a first travel mode of the present invention, and is a travel mode in which electric power is supplied to the motor MOT at least from the generator GEN, and the vehicle 1 travels on power that is output from the motor MOT according to the electric power.

Specifically, in the hybrid travel mode, the control device 100 controls both the first clutch CL1 and the second clutch CL2 to be disengaged. Further, in the hybrid travel mode, the control device 100 performs control such that fuel is injected to the engine ENG and power is output from the engine ENG. The power output from the engine ENG is input to the generator GEN via the generator gear train Gg. As a result, the generator GEN generates power.

Then, in the hybrid travel mode, the control device 100 performs control such that the electric power generated by the generator GEN is supplied to the motor MOT, and power corresponding to the electric power is output to the motor MOT (shown as Motor: "driven by generator"). The electric power supplied from the generator GEN to the motor MOT is larger than the electric power supplied from the battery BAT to the motor MOT. Therefore, in the hybrid travel mode, the power output from the motor MOT (driving force of the motor MOT) can be increased as compared with that in the EV travel mode, and a large driving force can be obtained as the driving force of the vehicle 1.

In the hybrid travel mode, the control device 100 may perform control such that the electric power is supplied from the battery BAT to the motor MOT if necessary. That is, in the hybrid travel mode, the control device 100 may supply electric power from both the generator GEN and the battery BAT to the motor MOT. As a result, the electric power supplied to the motor MOT can be increased as compared to a case where the electric power is supplied to the motor MOT only from the generator GEN, and a larger driving force can be obtained as the driving force of the vehicle 1.

In addition, in order to provide the driver with a natural feeling in which the vehicle speed and the operating sound of the engine ENG are in conjunction with each other even in the hybrid travel mode, as to be described later, when the engine speed reaches a predetermined upper limit rotation speed, the control device 100 controls the engine speed by temporarily lowering the engine speed to a predetermined lower limit rotation speed and then increasing the engine speed again. A specific control example of the engine speed in the hybrid travel mode will be described later with reference to FIG. 3.

[Low Speed-Side Engine Travel Mode]

The low speed-side engine travel mode is an example of a second travel mode of the present invention, and is a travel mode in which power output from the engine ENG is transmitted to the driving wheels DW via the low speed-side power transmission path to drive the vehicle 1.

Specifically, in the low speed-side engine travel mode, the control device 100 performs control such that fuel is injected to the engine ENG and power is output from the engine ENG. Further, in the low speed-side engine travel mode, the control device 100 controls the first clutch CL1 to be engaged and controls the second clutch CL2 to be disengaged. Thus, in the low speed-side engine travel mode, the power output from the engine ENG is transmitted to the driving wheels DW via the low speed-side engine gear train GLo, the final gear train Gf, and the differential mechanism D to drive the vehicle 1.

In the low speed-side engine travel mode, the power output from the engine ENG is also input to the generator GEN via the generator gear train Gg, but the generator GEN is controlled so as not to generate power. For example, in the low speed-side engine travel mode, a switching element (for example, a switching element of an inverter device provided between the generator GEN and the battery BAT) provided in an electric power transmission path between the generator GEN and the battery BAT is turned off, and thus the generator GEN is controlled so as not to generate power. Thus, in the low speed-side engine travel mode, the loss caused by power generation of the generator GEN can be reduced, and an amount of heat generated by the generator GEN or the like can be reduced. In the low speed-side engine travel mode, during braking of the vehicle 1, regenerative power generation may also be performed by the motor MOT to charge the battery BAT with the generated electric power.

In the low speed-side engine travel mode, for example, the control device 100 stops the supply of electric power to the motor MOT, and stops the output of the power from the motor MOT. As a result, in the low speed-side engine travel mode, the load on the motor MOT can be reduced, and the amount of heat generated by the motor MOT can be reduced.

In the low speed-side engine travel mode, the control device 100 may perform control such that the electric power is supplied from the battery BAT to the motor MOT if necessary. Thus, in the low speed-side engine travel mode, the vehicle 1 can also travel using the power output from the motor MOT based on the electric power supplied from the battery BAT, and as compared with the case where the vehicle 1 travels on only the power of the engine ENG, a larger driving force can be obtained as the driving force of the vehicle 1.

[High Speed-side Engine Travel Mode]

The high speed-side engine travel mode is a travel mode in which the power output from the engine ENG is transmitted to the driving Wheels DW via the high speed-side power transmission path to drive the vehicle 1.

Specifically, in the high speed-side engine travel mode, the control device 100 performs control such that fuel is injected to the engine ENG and power is output from the engine ENG. Further, in the high speed-side engine travel mode, the control device 100 controls the second clutch CL2 to be engaged, and controls the first clutch CL1 to be disengaged. Thus, in the high speed-side engine travel mode, the power output from the engine ENG is transmitted to the driving wheels DW via the high speed-side engine gear train GHi, the final gear train Gf, and the differential mechanism D to drive the vehicle 1.

In the high speed-side engine travel mode, the power output from the engine ENG is also input to the generator GEN via the generator gear train Gg, but the generator GEN is controlled so as not to generate power. As a result, in the high speed-side engine travel mode, the loss caused by the power generation of the generator GEN can be reduced, and the amount of heat generated by the generator GEN or the like can be reduced. In the high speed-side engine travel mode, during braking of the vehicle 1, regenerative power generation may also be performed by the motor MOT to charge the battery BAT with the generated electric power.

In the high speed-side engine travel mode, for example, the control device 100 stops the supply of electric power to the motor MOT, and stops the output of the power from the motor MOT. As a result, in the high speed-side engine travel mode, the load on the motor MOT can be reduced, and the amount of heat generated by the motor MOT can be reduced.

In the high speed-side engine travel mode, the control device 100 may supply the electric power from the battery BAT to the motor MOT if necessary. Thus, in the high speed-side engine travel mode, the vehicle 1 can also travel using the power output from the motor MOT based on the electric power supplied from the battery BAE and as compared with the case where the vehicle 1 travels on only the power of the engine ENG, a larger driving force can be obtained as the driving force of the vehicle 1.

[Engine Speed in Hybrid Travel Mode]

Figure 3:
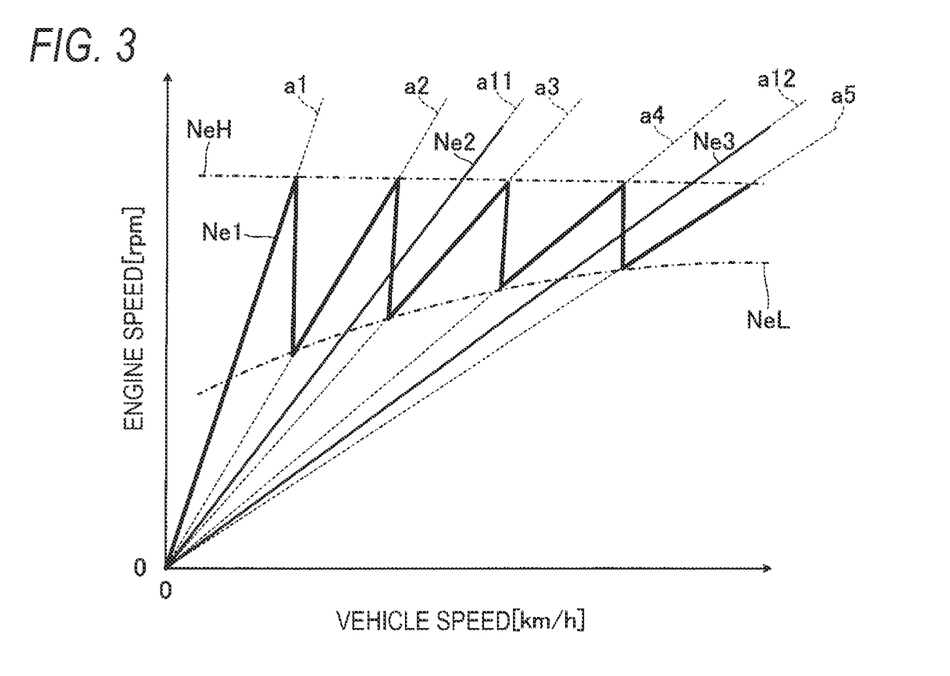
FIG. 3 is a graph showing a control example of a rotation speed of an engine in a hybrid travel mode.

Next, a control example of the engine speed in the hybrid travel mode will be described with reference to FIG. 3. In FIG. 3, a vertical axis shows the engine speed [rpm], and a horizontal axis shows a vehicle speed [km/h].

The engine speed Ne1 shown in FIG. 3 is an engine speed in the hybrid travel mode. As shown in the engine speed Ne1, in the hybrid travel mode, the control device 100 controls, for example, by an engine control unit 131 to be described later, the engine speed so as to fluctuate between an upper limit rotation speed NeH and a lower limit rotation speed NeL that are predetermined.

Specifically, in the hybrid travel mode, the control device 100 first increases the engine speed, as the vehicle speed increases, at a predetermined increase rate a1 from a state where both the vehicle speed and the engine speed are 0 (zero). Then, when the engine speed reaches an upper limit rotation speed NeH corresponding to the vehicle speed at that time, the engine speed is reduced to a lower limit rotation speed NeL corresponding to the vehicle speed at that time. Thereafter, the control device 100 increases the engine speed from the lower limit rotation speed. Net, as the vehicle speed increases again. However, at this time, the engine speed is increased at an increase rate a2 smaller than the increase rate al.

In the same way thereafter, when the engine speed reaches an upper limit rotation speed NeH, the control device 100 reduces the engine speed to the lower limit rotation speed NeL, and as the vehicle speed increases, increases the engine speed while changing the increase rate to an increase rate a3, an increase rate a4, and an increase rate a5 each time. Here, the increase rate a2>the increase rate a3>the increase rate a4>the increase rate a5.

In the hybrid travel mode, since both the first clutch CU and the second clutch CL2 are disengaged as described above, the engine speed can be set freely regardless of the vehicle speed. However, by controlling the engine speed so as to fluctuate between the upper limit rotation speed NeH and the lower limit rotation speed NeL as the vehicle speed increases, the driver can feel a natural change in operating sound of the engine ENG in conjunction with the vehicle speed as if the gear is shifted by a stepped transmission even the vehicle 1 is travelling in the hybrid travel mode.

Further, an engine speed Ne2 shown in FIG. 3 is an engine speed in the low speed-side engine travel mode. As described above, in the low speed-side engine travel mode, the engine ENG and the axle DS (that is, the driving wheels DW) are mechanically connected. Therefore, as indicated by the engine speed Ne2, the engine speed and the vehicle speed linearly correspond to each other. Specifically, in the present embodiment, in the low speed-side engine travel mode, the engine speed increases at an increase rate a11 as the vehicle speed increases. For example, here, the increase rate a2>the increase rate a11>the increase rate a3.

Further, an engine speed Ne3 shown in FIG. 3 is an engine speed in the high speed-side engine travel mode. As described above, in the high speed-side engine travel mode, the engine ENG and the axle DS are mechanically connected in the same manner as in the low speed-side engine travel mode. Therefore, as indicated by the engine speed Ne3, the engine speed and the vehicle speed linearly correspond to each other. Specifically, in the present embodiment, in the high speed-side engine travel mode, the engine speed increases at an increase rate alt as the vehicle speed increases. Fax example, here, the increase rate a4>the increase rate a12>the increase rate a5.

Although the engine speed Ne2 and the engine speed Ne3 in a state where the vehicle speed is 0 (zero) are illustrated in FIG. 3 for easy understanding, the low speed-side engine travel mode or the high speed-side engine travel mode may not be actually set when the vehicle speed is 0 (zero).

[Functional Configuration of Control Device]

Figure 4:
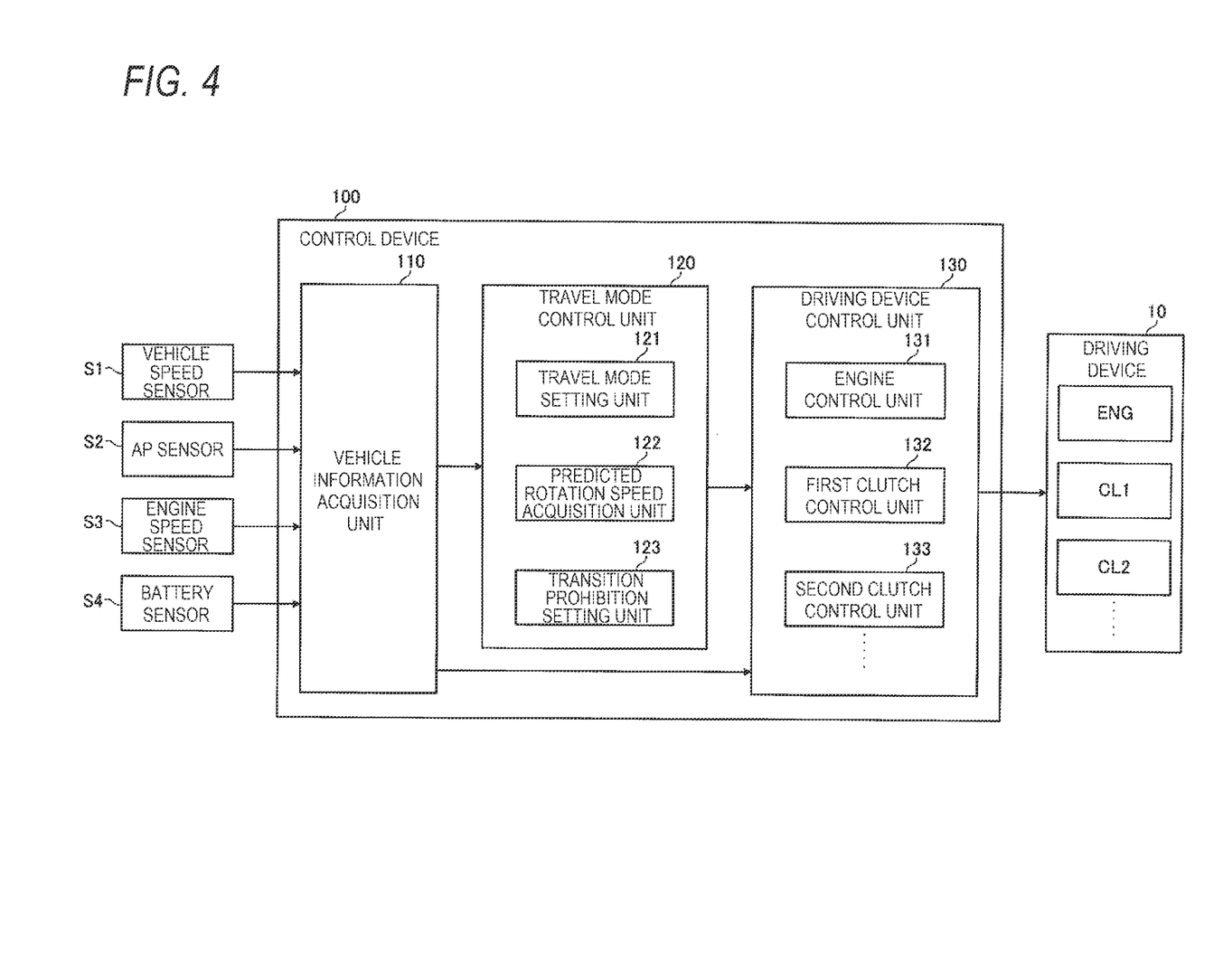
FIG. 4 is a block diagram showing a functional configuration of the control device.

Next, a functional configuration of the control device 100 will be described with reference to FIG. 4. As shown in FIG. 4, the control device 100 includes a vehicle information acquisition unit 110 that acquires the vehicle information, a travel mode control unit 120 that controls a travel mode in the vehicle 1, and a driving device control unit 130 that controls the driving device 10.

For example, the vehicle information acquisition unit 110, the travel mode control unit 120, and the driving device control unit 130 can realize the functions thereof by executing programs stored in a memory by a processor of the ECU that implements the control device 100, or by an interface of the ECU.

The vehicle information acquisition unit 110 acquires vehicle information based on detection signals and the like sent from various sensors provided in the vehicle 1 to the control device 100, and transmits the acquired vehicle information to the travel mode control unit 120 and the driving device control unit 130. As described above, the vehicle information includes information indicating the traveling state of the vehicle 1 such as the vehicle speed, the AP opening degree, and the engine speed. Thus, the vehicle information acquisition unit 110 can notify the travel mode control unit 120 and the driving device control unit 130 of the traveling state of the vehicle 1.

For example, the vehicle speed can be acquired based on a detection signal from a vehicle speed sensor S1 that detects a rotation speed of the axle DS. The AP opening degree can be acquired based on a detection signal from an accelerator position sensor (AP sensor) S2 that detects an operation amount with respect to the accelerator pedal provided in the vehicle 1. The engine speed can be acquired based on a detection signal from an engine speed sensor (ENG speed sensor) S3 that detects the engine speed. Further, the vehicle information acquisition unit 110 may acquire vehicle information including information indicating the required driving force of the vehicle 1 that was derived based on the vehicle speed, the AP opening degree, and the like.

The vehicle information further includes battery information. The battery information includes information indicating the SOC of the battery BAT Specifically, the vehicle 1 includes a battery sensor S4 that detects an inter-terminal voltage or charge/discharge current of the battery BAT, a temperature of the battery BAT, and the like. The battery sensor 54 sends the detected signals to the control device 100. The vehicle information acquisition unit 110 acquires battery information including information indicating the SOC of the battery BAT that is derived based on the inter-terminal voltage, the charge/discharge current, the temperature, and the like of the battery BAT that are detected by the battery sensor S4. The battery information may include information indicating the inter-terminal voltage, the charge/discharge current, the temperature, and the like of the battery BAT That are detected by the battery sensor S4.

The travel mode control unit 120 includes a travel mode setting unit 121, a predicted rotation speed acquisition unit 122, and a transition prohibition setting unit 123. Based on the traveling state of the vehicle 1, the travel mode setting unit 121 sets any travel mode among the plurality of travel modes as the travel mode in which the vehicle 1 travels.

Specifically, the control device 100 stores in advance information indicating a transition condition that is a condition for transition to each of the travel modes. The information indicating the transition condition is configured such that information indicating, for example, a pre-transition travel mode (for example, the hybrid travel mode), a transition destination travel mode (for example, the low speed-side engine travel mode), and a traveling state of the vehicle 1 (for example, the vehicle speed and the driving force of vehicle 1) which is a transition condition from the pre-transition travel mode to the transition destination travel mode are associated with one another. The travel mode setting unit 121 sets the travel mode in which the vehicle 1 travels by referring to the traveling state of the vehicle 1, the current travel mode of the vehicle 1, and the information indicating the transition condition, which are indicated by the vehicle information.

For example, it is assumed that the traveling state of the vehicle 1 that is travelling in the hybrid travel mode is charged so as to match the traveling state of the vehicle 1 which is the transition condition from the hybrid travel mode to the low speed-side engine travel mode. In this case, the traveling mode setting unit 121 shifts the travel mode of the vehicle 1 from the hybrid travel mode to the low speed-side engine travel mode on the assumption that the transition condition from the hybrid travel mode to the low speed-side engine travel mode is satisfied. Specifically, in this case, the travel mode setting unit 121 shifts the travel mode from the hybrid travel mode to the low speed-side engine travel mode by the driving device control unit 130 controlling the first clutch CL1 to be engaged.

Hereinafter, the transition condition from the hybrid travel mode to the low speed-side engine travel mode is also simply referred to as "transition condition to the low speed-side engine travel mode". Hereinafter, the transition from the hybrid travel mode to the low speed-side engine travel mode is also simply referred to as "transition to the low speed-side engine travel mode".

As described above, in the hybrid travel mode in which the axle DS (that is, the driving wheels DW) and the engine ENG are not mechanically connected and the engine speed fluctuates between the upper limit rotation speed NeH and the lower limit rotation speed NeL, the engine speed may be the upper limit rotation speed NeH even if the vehicle speed is in a low speed range, or the engine speed may be the lower limit rotation speed NeL even if the vehicle speed is in a high speed range.

Meanwhile, in the low speed-side engine travel mode in which the axle DS and the engine ENG are mechanically connected, the engine speed and the vehicle speed linearly correspond to each other. That is, in the low speed-side engine travel mode, since the engine speed increases monotonously as the vehicle speed increases, the engine ENG does not rotate at high speed when the vehicle speed is in the low speed range, and the engine ENG does not rotate at low speed when the vehicle speed is in the high speed range.

Due to such a difference in engine speed characteristics between the hybrid travel mode and the low speed-side engine travel mode, when the transition to the low speed-side engine travel mode is performed at a time when the transition condition to the low speed-side engine travel mode is satisfied, there is a possibility that a sudden change in engine speed that is not intended by the driver may occur along with the transition. Such a sudden change in engine speed may lead to a reduction in marketability of the vehicle 1 from the viewpoint of NV.

Therefore, when it is predicted that the sudden change in engine speed may occur due to the transition to the low speed-side engine travel mode even if the transition condition to the low speed-side engine travel mode is satisfied, the travel mode setting unit 121 prohibits the transition to the low speed-side engine travel mode so as not to perform the transition.

Specifically, when the transition condition to the low speed-side engine travel mode is satisfied based on the traveling state of the vehicle 1 that is travelling in the hybrid travel mode, the predicted rotation speed acquisition unit 122 provided in the travel mode control unit 120 acquires a predicted rotation speed which is a predicted value of the engine speed when the travel mode is shifted to the low speed-side engine travel mode at a time when the transition condition is satisfied.

For example, the control device 100 stores in advance correspondence information indicating a correspondence relationship between the vehicle speed and the engine speed in the low speed-side engine travel mode. The predicted rotation speed acquisition unit 122 acquires, as the predicted rotation speed, an engine speed corresponding to the vehicle speed indicated by the vehicle information by referring to the correspondence information.

For example, it is assumed that the vehicle speed at a time when the transition condition to the low speed-side engine travel mode is satisfied is vX. Further, it is assumed that in the correspondence information, the engine speed corresponding to the vehicle speed vX is NeX. In this case, the predicted rotation speed acquisition unit 122 acquires the NeX corresponding to the vX in the correspondence information as the predicted rotation speed when the travel mode is shifted to the low speed-side engine travel mode at a time when the transition condition to the low speed-side engine travel mode is satisfied.

Then, the transition prohibition setting unit 123 provided in the travel mode control unit 120 prohibits the transition to the low speed-side engine travel mode based on the engine speed at a time when the transition condition to the low speed-side engine travel mode is satisfied and the predicted rotation speed when the travel mode is shifted to the low speed-side engine travel mode at a time when the transition condition is satisfied.

Specifically, the transition prohibition setting unit 123 determines whether a difference between the engine speed at a time when the transition condition to the low speed-side engine travel mode is satisfied and the predicted rotation speed when the travel mode is shifted to the low speed-side engine travel mode at a time when the transition condition is satisfied is equal to or larger than a threshold value, The threshold value is determined in advance in consideration of, for example, an upper limit value of a fluctuation width of the engine speed allowed from the viewpoint of NV, and is stored in the control device 100.

Then, the transition prohibition setting unit 123 prohibits the transition to the low speed-side engine travel mode if the difference between the engine speed at a time when the transition condition to the low speed-side engine travel mode is satisfied and the predicted rotation speed when the travel mode is shifted to the low speed-side engine travel mode at a time when the transition condition is satisfied is equal to or larger than the threshold value.

For example, it is assumed that the vehicle speed is vX and the engine speed is NeY at a time when the transition condition to the low speed-side engine travel mode is satisfied. in this case, as described above, the NeX is acquired as the predicted rotation speed.

Therefore, the transition prohibition setting unit 123 determines whether a difference between the NeY that is the engine speed at a time when the transition condition to the low speed-side engine travel mode is satisfied and the NeX that is the predicted rotation speed when the travel mode is shifted to the low speed-side engine travel mode at a time when the transition condition is satisfied is equal to or larger than the threshold value.

That is, here, when the threshold value is set to Th, the transition prohibition setting unit 123 determines whether $|NeY-NeX| \geq Th$, and prohibits the transition to the low speed-side engine travel mode if $|NeY-NeX| \geq Th$. Thus, when the transition to the low speed-side engine travel mode is prohibited by the transition prohibition setting unit 123, the travel mode setting unit 121 does not performs the transition to the low speed-side engine travel mode even if the transition condition to the low speed-side engine travel mode is satisfied. Accordingly, the travel mode setting unit 121 can prevent the travel mode from being shifted to the low speed-side engine travel mode which leads to the occurrence of the sudden change in engine speed that is not intended by the driver.

Further, the transition prohibition setting unit 123 does not prohibit the transition to the low speed-side engine travel mode if the difference between the engine speed at a time when the transition condition to the low speed-side engine travel mode is satisfied and the predicted rotation speed when the travel mode is shifted to the low speed-side engine travel mode at a time when the transition condition is satisfied is smaller than the threshold value. That is, the transition prohibition setting unit 123 does not prohibit the transition to the low speed-side engine travel mode if $|NeY-NeX|<Th$.

Therefore, the travel mode setting unit 121 shifts the travel mode to the low speed-side engine travel mode at a time when the transition condition to the low speed-side engine travel mode is satisfied if the difference between the engine speed at a time when the transition condition to the low speed-side engine travel mode is satisfied and the predicted rotation speed when the travel mode is shifted to the low speed-side engine travel mode at a time when the transition condition is satisfied is smaller than the threshold value. Accordingly, the travel mode setting unit 121 can quickly shift the travel mode to the low speed-side engine travel mode when the sudden change in engine speed that is not intended by the driver does not occur, and the vehicle 1 can efficiently travel in the low speed-side engine travel mode corresponding to the traveling state of the vehicle 1.

Further, for example, when the transition to the low speed-side engine travel mode is prohibited by the transition prohibition setting unit 123, the predicted rotation speed acquisition unit 122 periodically acquires the predicted rotation speed when the travel mode is shifted to the low speed-side engine travel mode in a traveling state at that time. Then, when the predicted rotation speed is acquired by the predicted rotation speed acquisition unit 122, the transition prohibition setting unit 123 determines whether a difference between the predicted rotation speed and the engine speed at that time is smaller than the threshold value.

When it is determined that the difference between the predicted rotation speed and the engine speed at that time is smaller than the threshold value in the determination, the transition prohibition setting unit 123 releases the prohibition of transition to the low speed-side engine travel mode. Accordingly, when the sudden change in engine speed that is not intended by the driver does not occur, the travel mode setting unit 121 can shift the travel mode to the low speed-side engine travel mode.

The driving device control unit 130 controls the driving device 10 based on the travel mode set by the travel mode control unit 120 (the travel mode setting unit 121), the vehicle information acquired by the vehicle information acquisition unit 110, and the like. Specifically, the driving device control unit 130 includes the engine control unit 131 that controls the engine ENG, a first clutch control unit 132 that controls the first clutch CL1, and a second clutch control unit 133 that controls the second clutch CL2.

For example, in the low speed-side engine travel mode or the high speed-side engine travel mode, the engine control unit 131 controls the engine ENG to output a driving force that realizes the required driving force indicated by the vehicle information to the engine ENG. In the hybrid travel mode, the engine control unit 131 controls the engine ENG (that is, power generation of the generator in this case) to output a driving force that realizes the required driving force indicated by the vehicle information to the motor MOT. Further, in the hybrid travel mode, the engine control unit 131 controls the engine speed to fluctuate between the predetermined upper limit rotation speed NeH and lower limit rotation speed NeL as described above.

The first clutch control unit 132 controls engagement and disengagement of the first clutch CL1 according to the travel mode set by the travel mode control unit 120 (the travel mode setting unit 121). Specifically, as described above, the first clutch control unit 132 controls the first clutch CLI to be engaged when the low speed-side engine travel mode is set, and controls the first clutch CL1 to be disengaged when another travel mode is set.

Similarly to the first clutch control unit 132, the second clutch control unit 133 also controls the engagement and disengagement of the second clutch CL2 according to the travel mode set by the travel mode control unit 120. Specifically, as described above, the second clutch control unit 133 controls the second clutch CL2 to be engaged when the high speed-side engine travel mode is set, and controls the second clutch CL2 to be disengaged when another travel mode is set.

[Specific Example of Transition from Hybrid Travel Mode to Low Speed-Side Engine Travel Mode]

Figure 5:
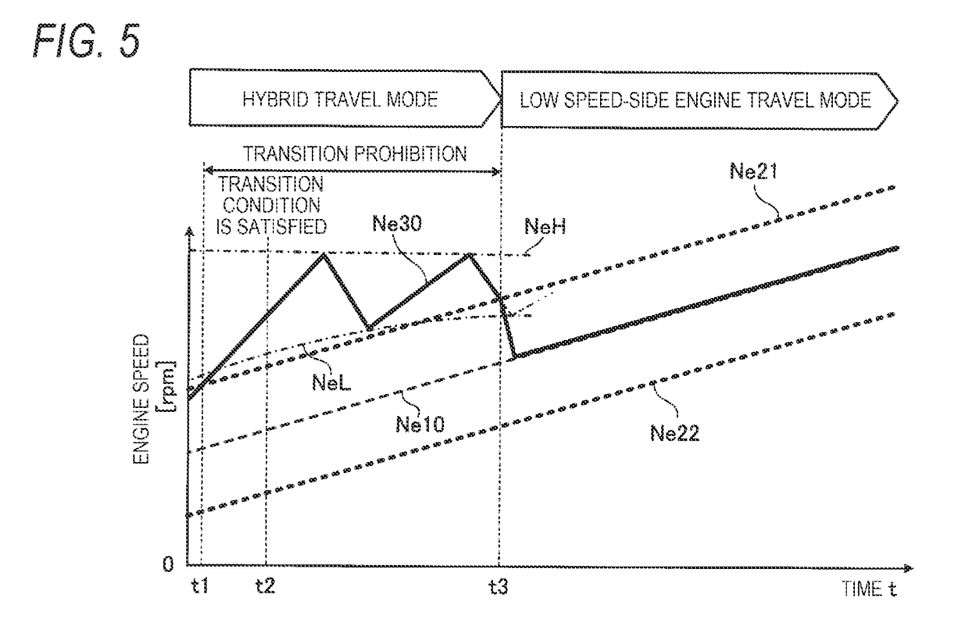
FIG. 5 is a graph showing a specific example of transition from the hybrid travel mode to a low speed-side engine travel mode.

Next, a specific example of transition from the hybrid travel mode to the low speed-side engine travel mode will be described with reference to FIG. 5. In FIG. 5, a vertical axis shows the engine speed [rpm], and a horizontal axis shows the time t. In the example of FIG. 5 described here, it is assumed that the vehicle 1 is traveling while accelerating at a constant acceleration.

In FIG. 5, a predicted rotation speed Ne10 is a predicted rotation speed corresponding to a vehicle speed at each time point in FIG. 5. When the vehicle 1 is traveling while accelerating at a constant acceleration, as shown in FIG. 5, the predicted rotation speed Ne10 increases monotonically as the vehicle speed increases, that is, with the elapse of time.

In FIG. 5, an upper limit value Ne21 is an upper limit value of the engine speed at which the transition to the low speed-side engine travel mode is permitted. Specifically, the upper limit value Ne21 is a value obtained by adding the threshold value to the predicted rotation speed Ne10. In FIG. 5, a lower limit value Ne22 is a lower limit value of the engine speed at which the transition to the low speed-side engine travel mode is permitted. Specifically, the lower limit value Ne22 is a value obtained by subtracting the threshold value from the predicted rotation speed Ne10.

In FIG. 5, an engine speed Ne30 is an engine speed at each time point in FIG. 5, Specifically, before a time point t3 shown in FIG. 5, the vehicle 1 is traveling in the hybrid travel mode under the control of the control device 100. Therefore, before the time point t3, the engine speed Ne30 is controlled to fluctuate between the upper limit rotation speed NeH and the lower limit rotation speed NeL as the vehicle speed increases, that is, with the elapse of time, as described above.

In FIG. 5, it is assumed that the engine speed Ne30 exceeds the upper limit value Ne21 during a period from a time point t1 (a time point earlier than the time point 13) to the time point t3. In this case, as shown in FIG. 5, during a period from the time point t1 to the time point t3. the control device 100 prohibits the transition to the low speed-side engine travel mode by the transition prohibition setting unit 123 so as not to shift the travel mode to the low speed-side engine travel mode. Accordingly, for example, even if the transition condition to the low speed-side engine travel mode is satisfied at a time point t2 between the time point t1 and the time point t3, the control device 100 does not shift the travel mode to the low speed-side engine travel mode at the time point t2.

Then, in a case where the transition condition to the low speed-side engine travel mode is satisfied when the transition to the low speed-side engine travel mode is prohibited, the control device 100 shifts the travel mode to the low speed-side engine travel mode at a time point thereafter when the engine speed Ne30 is smaller than the upper limit value Ne21. In the example shown in FIG. 5, since the engine speed Ne30 is smaller than the upper limit value Ne21 at the time point t3, the control device 100 shifts the travel mode to the low speed-side engine travel mode immediately after the time point t3.

Although not shown, the control device 100 performs control in a case where the engine speed Ne30 is equal to or smaller the lower limit value Ne22 as in the case where the engine speed Ne30 is equal to or larger than the upper limit value Ne21. That is, when the engine speed Ne30 is equal to or smaller than the lower limit value Ne22 in the hybrid travel mode, the control device 100 prohibits the transition to the low speed-side engine travel mode. Then, in a case where the transition to the low speed-side engine travel mode is prohibited, when the engine speed Ne30 is larger than the lower limit value Ne22 thereafter, the control device 100 releases the prohibition of the transition to the low speed-side engine travel mode.

As described above, when it is predicted that a sudden change in engine speed may occur due to the transition to the low speed-side engine travel mode, the control device 100 prohibits the transition to the low speed-side engine travel mode. Then, even if the transition condition to the low speed-side engine travel mode is satisfied. when the transition to the low speed-side engine travel mode is prohibited, the transition to the low speed-side engine travel mode is not performed. Accordingly, the control device 100 prevents the transition to the low speed-side engine travel mode which leads to the occurrence of the sudden change in engine speed that is not intended by the driver, and it possible to prevent deterioration in marketability of the vehicle 1 from the viewpoint of NV.

An embodiment of the present invention has been described above, but the present invention is not limited to the above embodiment, and can be appropriately modified, improved, or the like.

For example, contents of prohibiting the transition from the hybrid travel mode to the low speed-side engine travel mode has been described in the above embodiment, and similarly, it is conceivable a possibility that a sudden change in engine speed occurs due to transition from the hybrid travel mode to the high speed-side engine travel mode. Therefore, when it is predicted that a sudden change in engine speed occurs due to the transition from the hybrid travel mode to the high speed-side engine travel mode, the control device 100 may prohibit the transition.

Specifically, correspondence information indicating a correspondence relationship between a vehicle speed and an engine speed in the high speed-side engine travel mode is stored in advance in the control device 100, so that the control device 100 can acquire, by referring to the correspondence information, the predicted rotation speed when the travel mode is shifted to the high speed-side engine travel mode. Then, based on the predicted rotation speed acquired in this way, the control device 100 determines whether a sudden change in engine speed occurs due to the transition to the high speed-side engine travel mode, and may prohibit the transition to the high speed-side engine travel mode if it is determined.

that the sudden change may occur.

Similarly, if it is determined that the sudden change in engine speed may occur due to the transition from the low speed-side engine travel mode to the high speed-side engine travel mode or the transition from the high speed-side engine travel mode to the low speed-side engine travel mode, the control device 100 may prohibit the transition.

The present specification describes at least the following matters. The components and the like corresponding to the above-described embodiments are shown in parentheses, but the present invention is not limited thereto.

A control device (control device 100) of a vehicle (vehicle 1) configured to travel in a plurality of travel modes including:

(1) a first travel mode (hybrid travel mode) in which in response to supply of electric power generated by a generator (generator GEN), power output by an electric motor (motor MOT) is transmitted to a driving wheel (driving wheels DW) to drive the vehicle, the generator generating the electric power by using power of an internal combustion engine (engine ENG), and a second travel mode (low speed-side engine travel mode) in which power of the internal combustion engine is transmitted to the driving wheel to drive the vehicle, the control device comprising:

a travel mode control unit (travel mode control unit 120) configured to set, based on a traveling state of the vehicle, any travel mode among the plurality of travel modes as a travel mode in which the vehicle travels; and a predicted rotation speed acquisition unit (predicted rotation speed acquisition unit 122) configured to acquire, when a transition condition to the second travel mode is satisfied based on the traveling state of the vehicle that is travelling in the first travel mode, a predicted rotation speed of the internal combustion engine when the travel mode is shifted to the second travel mode at a time when the transition condition is satisfied, wherein the travel mode control unit includes a transition prohibition setting unit (transition prohibition setting unit 123) configured to prohibit transition to the second travel mode when a difference between a rotation speed of the internal combustion engine at a time when the transition condition is satisfied and the predicted rotation speed acquired by the predicted rotation speed acquisition unit is equal to or larger than a threshold value.

According to the above-described (1), since the transition to the second travel mode is prohibited when a difference between the rotation speed of the internal combustion engine at a time when the transition condition to the second travel mode is satisfied and the predicted rotation speed of the internal combustion engine at a time when the transition condition is satisfied is equal to or larger than the threshold value, the travel mode is not shifted to the second travel mode, thereby preventing a sudden change in rotation speed of the engine that is not intended by a driver.

(2) In the control device of a vehicle according to (1), the predicted rotation speed acquisition unit further acquires a predicted rotation speed of the internal combustion engine when the travel mode is shifted to the second travel mode at a time when the transition prohibition setting unit prohibits the transition to the second travel mode, and the transition prohibition setting unit releases the prohibition of transition to the second travel mode when a difference between a rotation speed of the internal combustion engine at a time when the transition to the second travel mode is prohibited and the predicted rotation speed when the travel mode is shifted to the second travel mode at a time when the transition to the second travel mode is prohibited is smaller than the threshold value.

According to the above-described (2), since the prohibition of transition to the second travel mode is released when the difference between the rotation speed of the internal combustion engine at a time when the transition condition to the second travel mode is prohibited and the predicted rotation speed of the internal combustion engine when the travel mode is shifted to the second travel mode at that time is smaller than the threshold value, the sudden change in engine speed that is not intended by the driver does not occur, so that in this case, the travel mode can be shifted to the second travel mode.

(3) In the control device of a vehicle according to (2), in a case where the transition condition to the second travel mode is satisfied at a time when the transition to the second travel mode is prohibited, the travel mode control unit shifts the travel mode to the second travel mode when the prohibition of transition to the second travel mode is released.

According to the above-described (3), since the travel mode is shifted to the second travel mode when the prohibition of transition to the second travel mode is released in a case where the transition condition to the second travel mode is satisfied at a time when the transition to the second travel mode is prohibited, the travel mode can be shifted to the second travel mode while preventing the sudden change in rotation speed of the internal combustion engine.

(4) In the control device of a vehicle according to any one of the above-described (1) to (3), when the difference between the rotation speed of the internal combustion engine at a time when the transition condition is satisfied and the predicted rotation speed at a time when the transition condition is satisfied is smaller than the threshold value, the travel mode control unit shifts the travel mode to the second travel mode at a time when the transition condition is satisfied.

According to the above-described (4), since the travel mode is shifted to the second travel mode at a time when the transition condition to the second travel mode is satisfied when the difference between the rotation speed of the internal combustion engine at a time when the transition condition to the second travel mode is satisfied and the predicted rotation speed is smaller than the threshold value, the sudden change in rotation speed of the internal combustion engine does not occur, so that in this case, the travel mode can be quickly shifted to the second travel mode corresponding to the traveling state of the vehicle.

(5) The control device of a vehicle according to any one of the above-described (1) to (4) further includes:

an internal combustion engine control unit (engine control unit 131) configured to control the internal combustion engine, and when the vehicle is traveling in the first travel mode, the internal combustion engine control unit increases a rotation speed of the internal combustion engine to a first rotation speed as the vehicle speed increases and reduces the rotation speed of the internal combustion engine to a second rotation speed smaller than the first rotation speed when the rotation speed of the internal combustion engine reaches the first rotation speed.

According to the above-described (5), when the vehicle is traveling in the first travel mode, the rotation speed of the internal combustion engine is increased to the first rotation speed as the vehicle speed increases and is reduced to the second rotation speed smaller than the first rotation speed when the rotation speed of the internal combustion engine reaches the first rotation speed, so that even in the first travel mode, the driver can experience a natural feeling in which the vehicle speed and the driving sound of the internal combustion engine are conjunction with each other as if the vehicle were equipped with a stepped transmission.

What is claimed is:

1. A control device of a vehicle configured to travel in a plurality of travel modes including:
    a first travel mode in which in response to supply of electric power generated by a generator, power output by an electric motor is transmitted to a driving wheel to drive the vehicle, the generator generating the electric power by using power of an internal combustion engine, and
    a second travel mode in which power of the internal combustion engine is transmitted to the driving wheel to drive the vehicle, the control device comprising:
    a travel mode control unit configured to set, based on a traveling state of the vehicle, any travel mode among the plurality of travel modes as a travel mode in which the vehicle travels; and
    a predicted rotation speed acquisition unit configured to acquire, when a transition condition to the second travel mode is satisfied based on the traveling state of the vehicle that is travelling in the first travel mode, a predicted rotation speed of the internal combustion engine when the travel mode is shifted to the second travel mode at a time when the transition condition is satisfied, wherein
    the travel mode control unit includes a transition prohibition setting unit configured to determine whether a difference between a rotation speed of the internal combustion engine when the transition condition is satisfied and the predicted rotation speed acquired by the predicted rotation speed acquisition unit is equal to or larger than a threshold value and prohibit transition to the second travel mode when it is determined that the difference is equal to or larger than the threshold value,
    when the difference between the rotation speed of the internal combustion engine at a time when the transition condition is satisfied and the predicted rotation speed at a time when the transition condition is satisfied is smaller than the threshold value, the travel mode control unit shifts the travel mode to the second travel mode at a time when the transition condition is satisfied, and
    the travel mode control unit, the predicted rotation speed acquisition unit, and the transition prohibition setting unit are each implemented via at least one processor.

2. The control device of a vehicle according to claim 1, wherein
    the predicted rotation speed acquisition unit further acquires a predicted rotation speed of the internal combustion engine when the travel mode is shifted to the second travel mode at a time when the transition prohibition setting unit prohibits the transition to the second travel mode, and
    the transition prohibition setting unit releases the prohibition of transition to the second travel mode when a difference between a rotation speed of the internal combustion engine at a time when the transition to the second travel mode is prohibited and the predicted rotation speed when the travel mode is shifted to the second travel mode at a time when the transition to the second travel mode is prohibited is smaller than the threshold value.

3. The control device of a vehicle according to claim 2, wherein
    in a case where the transition condition to the second travel mode is satisfied at a time when the transition to the second travel mode is prohibited, the travel mode control unit shifts the travel mode to the second travel mode when the prohibition of transition to the second travel mode is released.

4. The control device of a vehicle according to claim 1 further comprising:
    an internal combustion engine control unit configured to control the internal combustion engine, wherein
    when the vehicle is traveling in the first travel mode, the internal combustion engine control unit increases a rotation speed of the internal combustion engine to a first rotation speed as the vehicle speed increases and reduces the rotation speed of the internal combustion engine to a second rotation speed smaller than the first rotation speed when the rotation speed of the internal combustion engine reaches the first rotation speed, and
    the internal combustion engine control unit is implemented via at least one processor.

* * * * *